(12) United States Patent
Williams

(10) Patent No.: US 8,343,008 B1
(45) Date of Patent: Jan. 1, 2013

(54) VARIABLE SPEED DRIVE APPARATUS

(76) Inventor: Herbert L. Williams, Palatka, FL (US)

( * ) Notice: Subject to any disclaimer, the term of this patent is extended or adjusted under 35 U.S.C. 154(b) by 0 days.

(21) Appl. No.: 13/551,925

(22) Filed: Jul. 18, 2012

Related U.S. Application Data

(60) Provisional application No. 61/572,655, filed on Jul. 19, 2011.

(51) Int. Cl.
*F16H 3/44* (2006.01)
(52) U.S. Cl. .................................................. 475/323
(58) Field of Classification Search .............. 475/230, 475/231, 244, 900
See application file for complete search history.

(56) References Cited

U.S. PATENT DOCUMENTS

| | | | | |
|---|---|---|---|---|
| 4,280,375 A | * | 7/1981 | Goscenski, Jr. | 475/231 |
| 4,513,206 A | | 4/1985 | Gervasio et al. | |
| 5,033,996 A | | 7/1991 | Frey | |
| 5,039,083 A | | 8/1991 | Senn | |
| 5,171,194 A | * | 12/1992 | Shen | 475/330 |
| 5,947,854 A | * | 9/1999 | Kopko | 475/2 |
| 6,132,330 A | * | 10/2000 | Leggett | 475/335 |
| 6,857,846 B2 | | 2/2005 | Miller | |
| 7,223,193 B2 | * | 5/2007 | Hsieh | 475/230 |
| 2002/0170513 A1 | * | 11/2002 | Willmot | 123/90.15 |

* cited by examiner

*Primary Examiner* — David D Le
*Assistant Examiner* — David J Hlavka
(74) *Attorney, Agent, or Firm* — Thomas C. Saitta

(57) ABSTRACT

A variable speed drive apparatus having a pair of bevel pinions connecting a pair of bevel gears, the bevel pinions being mounted in a cage able to rotate independently of the bevel gears, which are connected to an input shaft and an output shaft. The rotational speed of the output shaft is monitored and is decreased if needed by retarding rotation of the cage in response to a higher than desired rate of rotation of the input shaft.

14 Claims, 1 Drawing Sheet

U.S. Patent
Jan. 1, 2013
US 8,343,008 B1
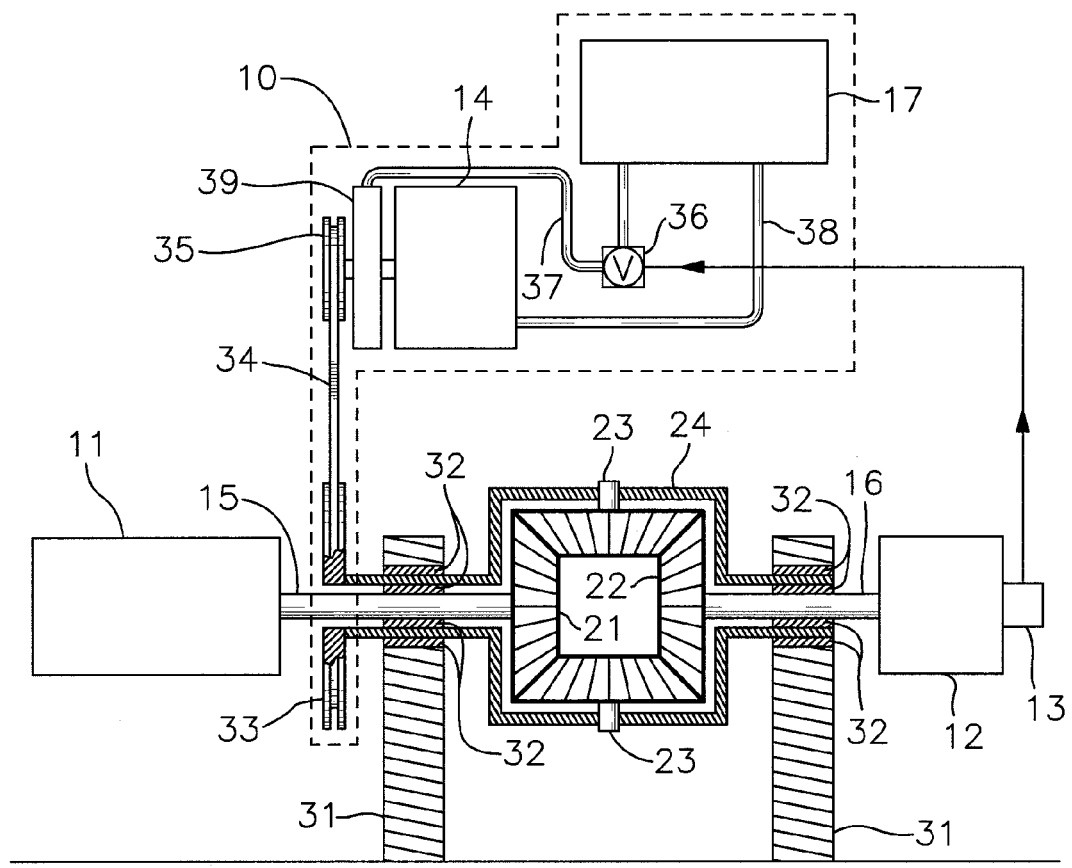

US 8,343,008 B1

VARIABLE SPEED DRIVE APPARATUS

This application claims the benefit of U.S. Provisional Patent Application No. 61/572,265, filed Jul. 19, 2011.

BACKGROUND OF THE INVENTION

This invention relates generally to the field of gearing arrangements wherein the rotational speed of an output shaft is controlled and maintained at a substantially constant rate despite variation in the rotational speed of an input shaft. More particularly, the invention relates to such gearing arrangements comprising cluster gears.

Wind turbines, also known as wind machines, can generate power efficiently and at low cost, typically by driving an air compressor or electrical generator. The effective rotation rate of the wind machine is increased through the use of gearing assemblies, small drive wheels, pulley transfer boxes or the like. Wind machines that drive rotating input shafts connected to electrical generators, air compressors or the like at increased revolutions per minute (RPM) relative to the actual RPM of the wind machine are shown, for example, in U.S. Pat. No. 7,399,162 and U.S. Published Patent Application No. 2012/0121418, the disclosures of which are incorporated herein by reference. Ideally, the RPM of the wind machine is multiplied such that even relatively slow rotation of the blade apparatus of the wind machine in low wind conditions will be sufficient to provide the minimum desired RPM of the electrical generators, air compressors, etc.

In such systems it is desirable to maintain the rotation rate of the compressor or generator within its optimum RPM range. It is also desirable to maintain the RPM below a maximum value to prevent damage to the compressor or generator. This can be difficult in that the RPM of the wind driven power source varies as a result of wind speed. For example, a typical generator may work best at a rotational speed of 1800 RPM, or have a preferred range between 1750-1850 RPM, and have a maximum RPM somewhat higher. The rotational speed of the input or drive shaft from the wind machine may be much higher than the optimum speed, and thus may need to be reduced to produce the optimum RPM and to maintain the RPM below the maximum cutoff. The RPM from the wind machine will also not be constant as it will vary relative to changes in wind speed.

It is an object of this invention to provide a variable speed drive apparatus suitable for use with wind machines wherein the output rotational speed of the wind machine is monitored and mechanisms are provided to adjust the rotational speed as needed in response to an increase and fluctuations in the rotational speed of the input or drive shaft above the optimum RPM range.

SUMMARY OF THE INVENTION

The invention is a variable speed drive apparatus comprising a drive mechanism with an input shaft, the rotational speed of the input shaft being variable and non-constant, and an output shaft driven by the input shaft, the output shaft powering an electrical generator, air compressor or similar work machine where a steady and constant rotational speed is desired within an optimum RPM range. The output shaft is connected to the input shaft by a set of cluster gears disposed within a cage or housing member, the cage able to rotate freely about the shared longitudinal axis of the input and output shafts. An input bevel gear is mounted to the input shaft and an output bevel gear is mounted to the output shaft, the bevel gears positioned in opposition in order to face each other. Operatively connecting the bevel gears are two bevel pinions, the bevel pinions being mounted to and in the cage in opposition to each other.

The input and output shafts are retained by bearings on a pair of mounts such that the shafts are free to rotate relative to the mounts. The cage is also retained by bearings on the mounts such that the cage may rotate freely relative to the mounts and to the input shaft. In this manner the rotational speed of the cage may differ from the rotational speed of the input shaft.

A retarding mechanism comprises for example a retarding or braking pulley connected to the cage, a control pulley and a belt member connects the retarding pulley to the control pulley. The control pulley is operatively connected to a compressed air brake mechanism, such as a clutch or piston brake, such that compressed air delivered from an air compressor or storage tank may be used to slow or retard the rotation of the control pulley, thereby slowing the rotation of the retarding pulley and the cage. An actuator sensor, such as including for example a mechanical governor, is provided in communication with the output shaft or the work machine itself to monitor the rotational speed and control the operation of the retarding mechanism.

With the cage free spinning and non-retarded in relation to the rotation of the input shaft, the cage and the output shaft turn at the same speed as the input shaft. If the rotational speed of the input shaft increases such that the rotational speed of the output shaft is greater than desired, the actuator sensor actuates the retarding mechanism, such as by opening a valve whereby stored compressed air is delivered to the air braking mechanism, such that rotation of the control pulley is slowed, which in turn slows the rotation of the cage and pinions relative to the rotation rate of the input shaft and the input bevel gear. This results in reduction of the rotation speed for the output shaft. When the rotational speed of the input shaft slows, the sensor actuator mechanism closes the valve to the required degree to lessen the braking effect on the control pulley such that the cage is allowed to rotate faster. Once the input rotation rate returns to the optimal RPM range, the cage is allowed to turn freely and the output rotation equals the input rotation. At such time the air compressor is used to produce compressed air which is sent to the air storage tank.

BRIEF DESCRIPTION OF THE DRAWINGS

FIG. 1 is a representative illustration of an embodiment of the invention.

DETAILED DESCRIPTION OF THE INVENTION

With reference to the drawings, the invention will now be described in detail with regard for the best mode and preferred embodiment(s). While not necessarily restricted to a particular application, the invention is well suited for use with a wind machine or wind turbine power system wherein a rotational driving force is created in response to variable wind currents.

The invention is a variable speed drive apparatus comprising a drive mechanism 11, such as for example a wind machine, producing a rotational force delivered through an input shaft 15, the rotational speed of the input shaft 15 being variable and non-constant, and an output shaft 16 driven by the input shaft 15, the output shaft 16 powering a generator or similar machine for producing work 12, such as an electrical generator for example, where a substantially steady and constant rotational speed within a desired range is desired for optimum electrical production The output shaft 16 is aligned coaxially with the input shaft 15 and is operatively connected to the input shaft 15 by a set of cluster gears orthogonally disposed within a cage or housing member 24, the cage 24 able to freely rotate about the shared longitudinal axis of the input and output shafts 15 and 16. An input bevel gear 21 is mounted to the input shaft 15 and an output bevel gear 22 is mounted to the output shaft 16, the bevel gears 21 and 22 positioned in opposition so as to face each other. Operatively connecting the bevel gears 21 and 22 are two bevel connecting gears or pinions 23, the bevel pinions 23 being rotatably mounted to and within the cage 24 in opposition to each other, such that the common rotational axis of the bevel pinions 23 intersects with the longitudinal axis of the input and output shafts 15 and 16. In this manner the axis of the bevel pinions 23 rotates about the longitudinal axis of the input and output shafts 15 and 16 when cage 24 rotates.

The input and output shafts 15 and 16 are retained by annular bearings 32 contained within a pair of mounts 31 such that the shafts 15 and 16 are free to rotate relative to the mounts 31. The cage 24 is also retained by bearings 32 on the mounts 31 such that the cage 24 may also rotate freely relative to the mounts 31 and also to the input shaft 15. In this manner the rotational speed of the cage 24 is able to differ from the rotational speed of the input shaft 15.

A retarding mechanism or system 10 is provided to control the RPM of the cage 24. In a preferred embodiment a retarding or braking pulley 33 is connected to the cage 24, the retarding pulley 33 also rotating about the shared longitudinal axis. A belt member 34 connects the retarding pulley 33 to a control pulley 35. A compressed air braking mechanism 39, such as a clutch or piston brake, is connected to the control pulley 35 for retarding rotation of the cage 24. An actuator sensor 13, including for example a mechanical governor, is provided in communication with the output shaft 16 or the work mechanism 12, or even possibly the input shaft 15. The actuator sensor 13 monitors the rotational rate of the output shaft 16 or the work machine 12 and actuates the air braking mechanism 39. An air compressor 14 is operationally connected to the control pulley 35 such that during rotation of the control pulley 35 compressed air is delivered through supply conduits 38 into a storage tank 17, the stored compressed air being delivered to the air braking mechanism 39 through valve 36 in response to direction from the actuator sensor 13.

With the cage 24 free spinning and non-retarded in relation to the rotation of the input shaft 15, the rotational speed of the input shaft 15 is transmitted through the cage 24, the input bevel gear 21, the pinions 23 and the output bevel gear 22 such that the output shaft 16 turns at the same speed as the input shaft 15. If the rotational speed of the output shaft 16 becomes greater than desired, the sensor actuator mechanism 13 opens a valve 36 to deliver stored compressed air from the storage tank 17 through control conduits 37 to the air braking mechanism 39, such that rotation of the control pulley 35 is slowed, which in turn slows the rotation of the cage 24 and pinions 23 about the shared longitudinal axis relative to the rotation speed of the input shaft 15 and the input bevel gear 21. This reduction results in reduction of rotation rate for the output shaft 16, such that the rate of rotation of the output shaft is maintained substantially constant within a desired range. If the rotational speed of the input shaft 15 begins to decrease back toward the desired RPM range, the sensor actuator mechanism 13 partially closes the valve 36 such that retardation is reduced and the rotational speed of the cage 24 is allowed to increase. When the rotational speed of the input shaft 15 returns to the optimum RPM range, the valve 36 is totally closed and the rotation of the output shaft 16 again matches the rotation of the input shaft 15. At such time the air compressor 14 produces compressed air which is sent to the air storage tank 17 through refill conduit 38 for future use. With this relationship, the RPM of the output shaft 16 and work machine 12 can be stabilized during fluctuations in the RPM of the input shaft 15.

It is understood that equivalents and substitutions for certain elements described above may be obvious to those skilled in the art, and therefore the true scope and definition of the invention is to be as set forth in the following claims.

I claim:

1. A variable speed drive apparatus comprising:
   an input shaft rotating at a variable rate;
   a rotating output shaft coaxially aligned with and operatively connected to said input shaft;
   a rotating cage mounted on said input shaft and said output shaft by bearings such that the rotation rate of said cage and the rotation rate of said input shaft may be different;
   an input bevel gear mounted on said input shaft within said cage;
   an output bevel gear mounted on said output shaft within said cage;
   a pair of opposing bevel pinions mounted to and within said cage; said bevel pinions operatively connecting said input bevel gear and said output bevel gear;
   a retarding mechanism operatively connected to said cage;
   an actuator sensor sensing the rate of revolution of said output shaft and controlling said retarding mechanism;
   wherein said retarding mechanism alters the rotation rate of said cage when said actuator sensor senses the rate of rotation of said output shaft to be greater than desired; and
   wherein said retarding mechanism comprises:
      a retarding pulley mounted on said input shaft;
      a control pulley connected to said retarding pulley by a belt;
      an air braking mechanism controlling the rate of rotation of said control pulley and thereby controlling the rate of rotation of said retarding pulley and said cage;
      said air braking mechanism controlled by said actuator sensor.

2. The apparatus of claim 1, further comprising an air compressor providing compressed air to operate said air braking mechanism.

3. The apparatus of claim 2, further comprising a storage tank receiving said compressed air produced by said air compressor, and a valve, said actuator sensor operating said valve to deliver said compressed air to said air braking mechanism.

4. The apparatus of claim 1, further comprising a work machine connected to said output shaft, and wherein said actuator sensor senses the rate of rotation of said output shaft by monitoring said work machine.

5. The apparatus of claim 1, further comprising a drive mechanism connected to said input shaft.

6. A variable speed drive apparatus comprising:
   an input shaft rotating at a variable rate;
   a rotating output shaft coaxially aligned with and operatively connected to said input shaft;
   a rotating cage mounted on said input shaft and said output shaft by bearings such that the rotation rate of said cage and the rotation rate of said input shaft may be different;
   an input bevel gear mounted on said input shaft within said cage;
   an output bevel gear mounted on said output shaft within said cage;
   a pair of opposing bevel pinions mounted to and within said cage; said bevel pinions operatively connecting said input bevel gear and said output bevel gear;
   a retarding mechanism operatively connected to said cage;

an actuator sensor sensing the rate of revolution of said output shaft and controlling said retarding mechanism;

wherein said retarding mechanism alters the rotation rate of said cage when said actuator sensor senses the rate of rotation of said output shaft to be greater than desired;

wherein said drive mechanism comprises a wind machine.

7. The apparatus of claim 1, further comprising a drive mechanism comprising a wind machine connected to said input shaft, and a work machine connected to said output shaft, and wherein said actuator sensor senses the rate of rotation of said output shaft by monitoring said work machine.

8. The apparatus of claim 3, further comprising a drive mechanism comprising a wind machine connected to said input shaft, and a work machine connected to said output shaft, and wherein said actuator sensor senses the rate of rotation of said output shaft by monitoring said work machine.

9. The apparatus of claim 7, wherein said work machine is an electrical generator.

10. The apparatus of claim 8, wherein said work machine is an electrical generator.

11. A variable speed drive apparatus comprising:
 a drive mechanism rotating an input shaft rotating at a variable rate;
 a rotating output shaft coaxially aligned with and operatively connected to said input shaft and operatively connected to an electrical generator;
 a rotating cage mounted on said input shaft and said output shaft by bearings such that the said cage is able to rotate independently of said input shaft;
 an input bevel gear mounted on said input shaft within said cage;
 an output bevel gear mounted on said output shaft within said cage;
 a pair of opposing bevel pinions mounted to and within said cage; said bevel pinions operatively connecting said input bevel gear to said output bevel gear;
 a retarding mechanism operatively connected to said cage, said retarding mechanism comprising a retarding pulley mounted on said input shaft, a control pulley connected to said retarding pulley by a belt, and an air braking mechanism controlling the rate of rotation of said control pulley and thereby controlling the rate of rotation of said retarding pulley and said cage;
 an actuator sensor sensing the rate of revolution of said output shaft and controlling said retarding mechanism;
 wherein said retarding mechanism alters the rotation rate of said cage when said actuator sensor senses the rate of rotation of said output shaft to be greater than desired.

12. The apparatus of claim 11, further comprising an air compressor providing compressed air to operate said air braking mechanism, a storage tank receiving said compressed air produced by said air compressor, and a valve, said actuator sensor operating said valve to deliver said compressed air to said air braking mechanism.

13. The apparatus of claim 11, wherein said drive mechanism is a wind machine.

14. The apparatus of claim 12, wherein said drive mechanism is a wind machine.

* * * * *